United States Patent
Jones

[11] 3,807,088
[45] Apr. 30, 1974

[54] CONTROLLED ENVIRONMENT HYDROPONIC SYSTEM

[75] Inventor: John L. Jones, Glendale, Ariz.

[73] Assignee: Hydroculture, Inc., Glendale, Ariz.

[22] Filed: May 1, 1972

[21] Appl. No.: 249,073

Related U.S. Application Data

[62] Division of Ser. No. 128,700, March 29, 1971, abandoned.

[52] U.S. Cl.......................... 47/1.2, 47/17, 98/33 R, 165/20
[51] Int. Cl............................................ A01g 31/00
[58] Field of Search.................. 47/1.2, 17; 98/33 R; 165/20, 60

[56] References Cited
UNITED STATES PATENTS

| | | | |
|---|---|---|---|
| 3,446,272 | 5/1969 | Gaines, Jr. | 165/21 |
| 2,060,735 | 11/1936 | Krueger | 47/1.2 |
| 3,246,643 | 4/1966 | Stark et al. | 98/33 R |
| 3,404,618 | 10/1968 | Jacobs | 98/33 R |
| 3,524,399 | 8/1970 | Bohanon | 98/33 R |
| 3,532,156 | 10/1970 | Berryhill | 165/20 X |
| 3,102,586 | 9/1963 | Van Diepenbroek | 165/60 |
| 2,750,868 | 6/1956 | Mieczkowski et al. | 98/116 |
| 3,474,720 | 10/1969 | Qualley et al. | 98/33 R |
| 3,383,179 | 5/1968 | Tibbitts | 165/16 X |
| 3,450,194 | 6/1969 | Barthel | 165/60 X |

*Primary Examiner*—Robert E. Pulfrey
*Assistant Examiner*—Eugene H. Eickholt
*Attorney, Agent, or Firm*—William H. Drummond

[57] ABSTRACT

In order to provide optimum environmental conditions for growing plants without soil, a translucent building is utilized to house the plants and apparatus for systematically controlling all aspects of the growing conditions including temperature and humidity of the ambient air, feeding schedules, nutrient makeup including ph, and intensity of the impinging sunlight. The outer shell of the building comprises corrugated fiberglass sheets overlapped and secured in position by means of turnbuckle-tightened cables passing circumferentially over the building which is generally half-cylindrical in shape. Within the building, the plants are raised in a plurality of longitudinally extending planter beds of washed gravel or the like. Nutrient is periodically pumped from a sump at one end of the building into the planter beds and subsequently, the excess nutrient is allowed to drain back into the nutrient sump.

Evaporative pads extend across a second end of the building, and means are provided for selectively dampening the pads and for drawing outside air across them in order to effect humidity and temperature control. A pair of exhaust fans at the opposite end of the building from the evaporator pads draws the outside air across the pads and through the growing chamber. A combination of louvers overlaying the pads, the fans, and temperature and humidity sensors as well as a heaterblower array are coordinated by appropriate electrical interconnections to maintain the temperature and humidity within the building at predetermined levels and provide circulation and replenishment of the air. Spray apparatus is utilized to lay a fine mist over the growing plants on those occasions during which sunlight becomes so intense as to be detrimental to unprotected plants, and can also be used to provide nutrients to the growing plants by foliar feeding.

1 Claim, 21 Drawing Figures

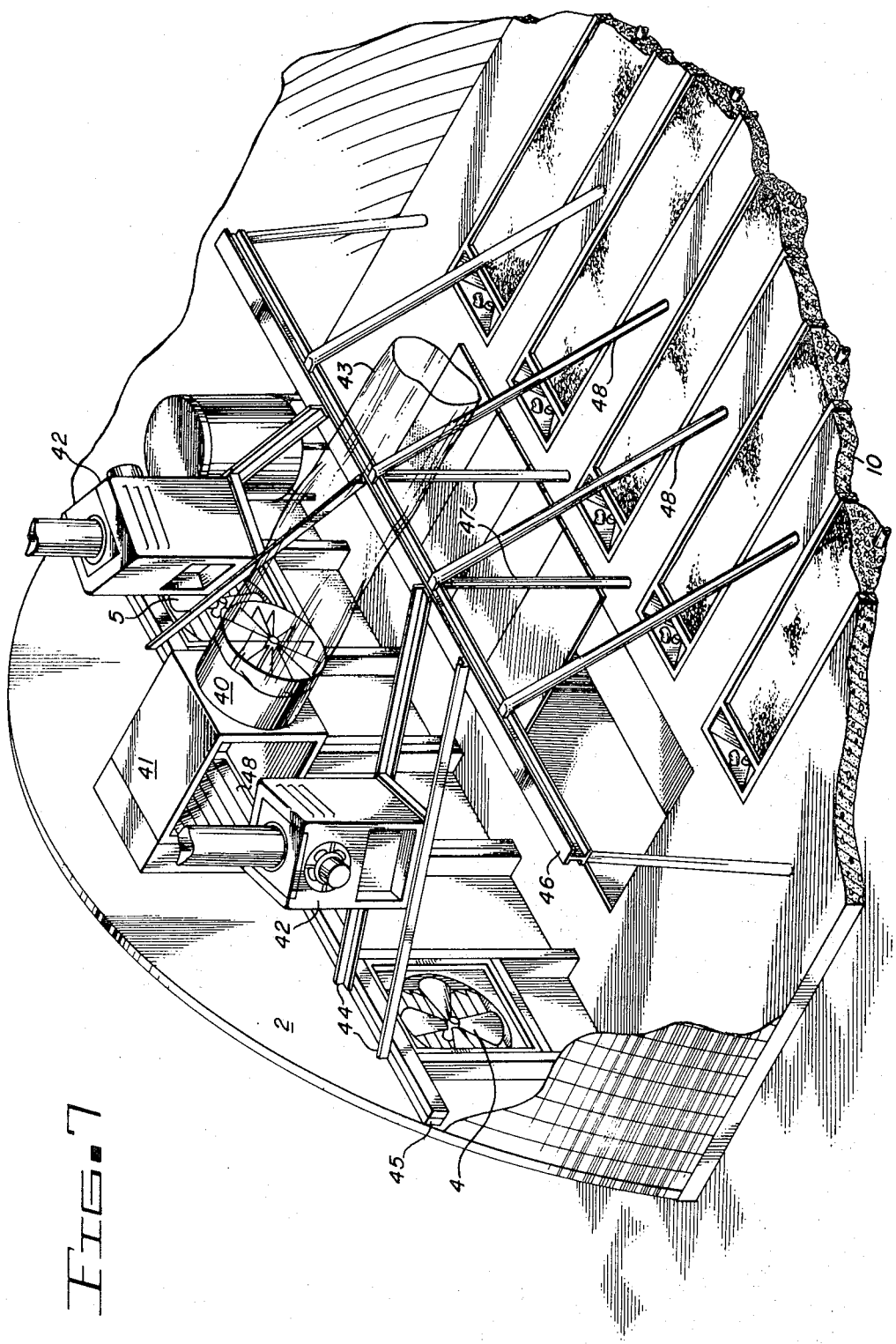

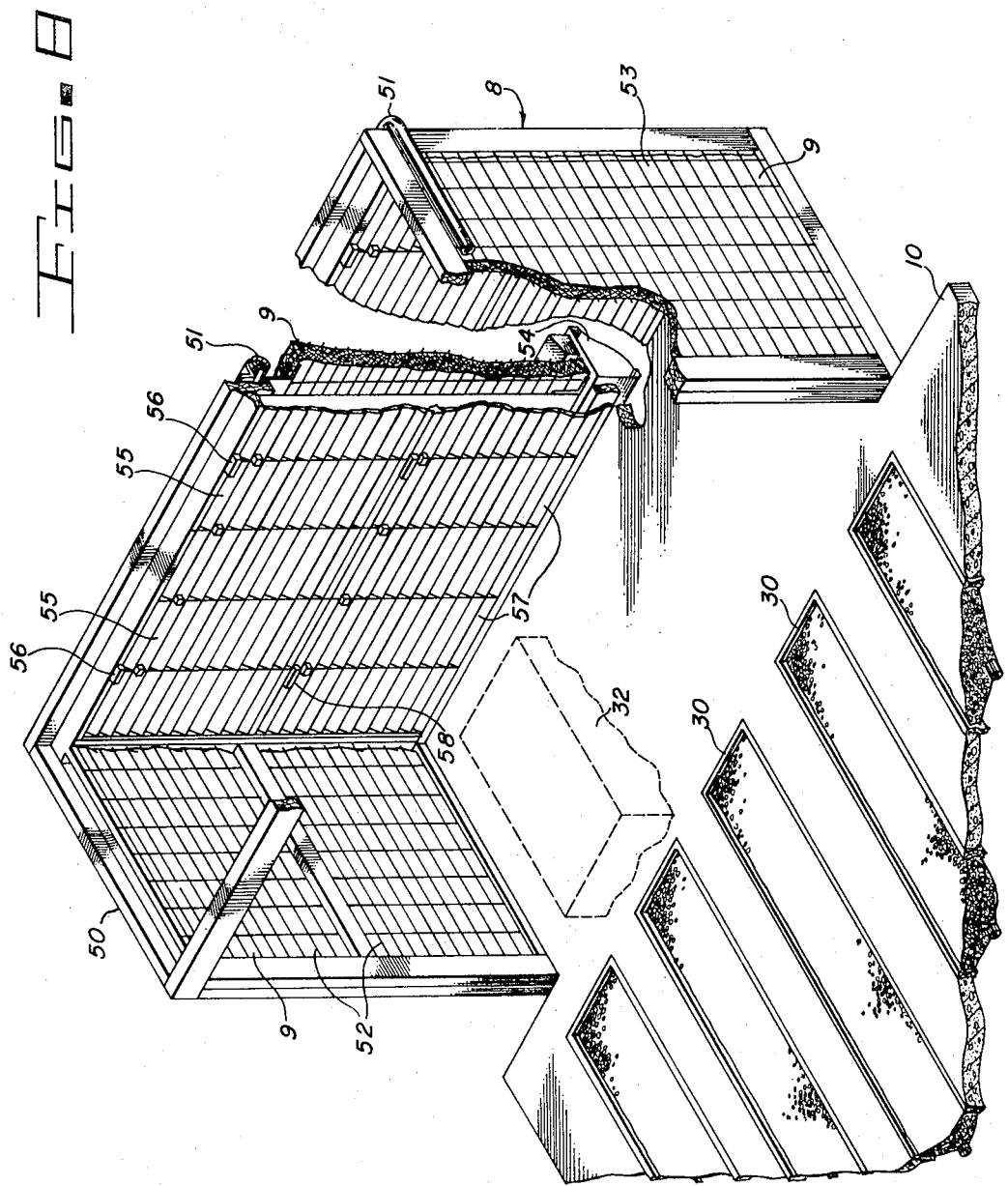

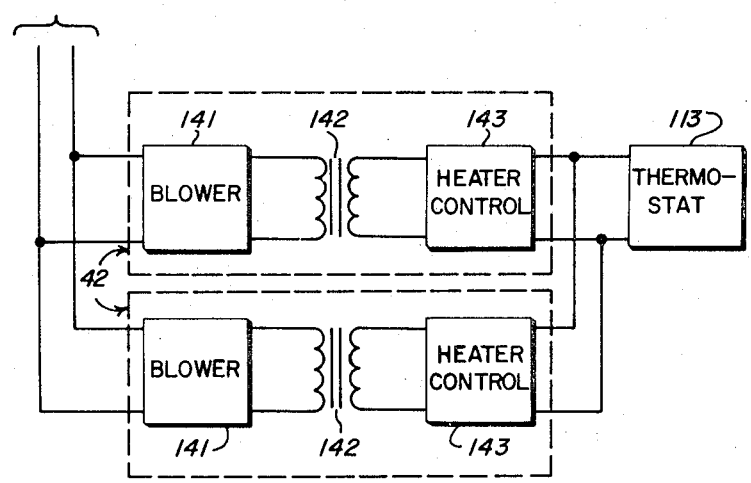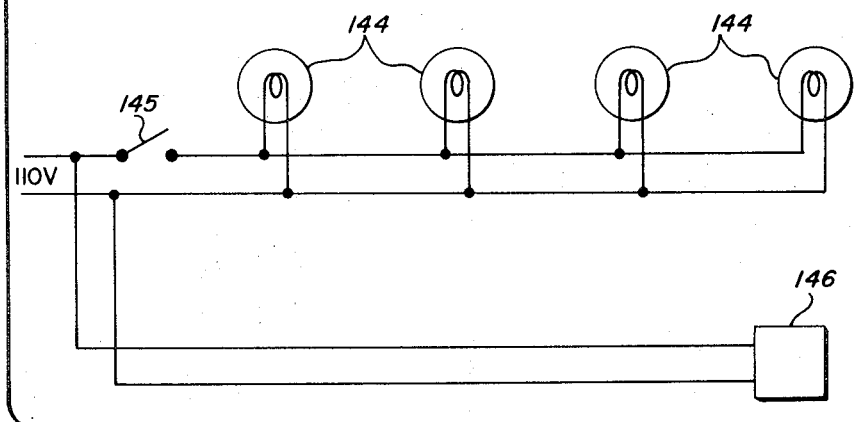
Fig. 21

CONTROLLED ENVIRONMENT HYDROPONIC SYSTEM

This application is a divisional application based on my copending prior application Ser. No. 128,700, filed Mar. 29, 1971, entitled "Hydroponic System," now abandoned.

This invention relates to the art of hydroponics and, more particularly, to a building and environmental control apparatus for providing optimum growing conditions for hydroponic culture.

The art of growing plants hydroponically or without the use of soil has been practiced for many years, although for the most part on an experimental or hobby level. Nonetheless, recent progress in the field has brought about a certain amount of commercial success as a result of improved techniques and the development of plant varities which are especially adapted for hydroponic culture. It has been shown that, under ideal conditions, very high grade crops can be grown with great rapidity with several crops per year output realizable. To achieve such results, it is necessary to exercise close control not only over the types of nutrient administered and the schedule of feedings, but also over the environment in which the plants grow. The control over environment must extend beyond that sustained in the ordinary greenhouse and yet, if the selling of commercial hydroponic crops is to be competitive with conventionally grown crops, the expense of controlling the environment and the nutrient must be kept within practical bounds. Inasmuch as the ambient weather conditions at various sites throughout the world obviously vary radically, the environmental control apparatus for a hydroponic system useful in such varying climates must be reliable and have a substantial range of control.

It is therefore a broad object of this invention to provide an improved system for growing plants hydroponically.

It is another broad object of this invention to provide a controlled environment for growing plants hydroponically.

It is a more specific object of this invention to provide a building for housing hydroponically grown plants and apparatus for controlling the environment therein to achieve optimum growing conditions for the plants.

It is yet another object of this invention to provide such a building in which temperature, humidity, and air circulation may be automatically maintained at predetermined levels.

Yet another object of this invention is to provide such a building which is simple and economical in construction and yet capable of functioning for many years reliably and with modest upkeep.

Another object of this invention is to incorporate into such a building apparatus for controlling the effects of overly brilliant sunlight, and which can also function to provide nutrients to the growing plants by foliar feeding.

Yet another object of this invention is to provide hydroponic planter beds for the plants and apparatus for periodically supplying nutrient to the planter beds in order to achieve optimum plant feeding.

The subject matter of the invention is particularly pointed out and distinctly claimed in the concluding portion of the specification. The invention, however, both as to organization and method of operation, may best be understood by reference to the following description taken in connection with the accompanying drawing of which:

FIG. 7 is a cut-away perspective view illustrating in detail certain elements of the air circulation and temperature control apparatus of the system;

FIG. 8 is a partially cut-away perspective view illustrating the evaporative pads and the louver system for controlling air flow through the pads to effect temperature and humidity control;

FIGS. 20 and 21 combined are a detail wiring diagram of the electrical system utilized within the building.

Figure 1:
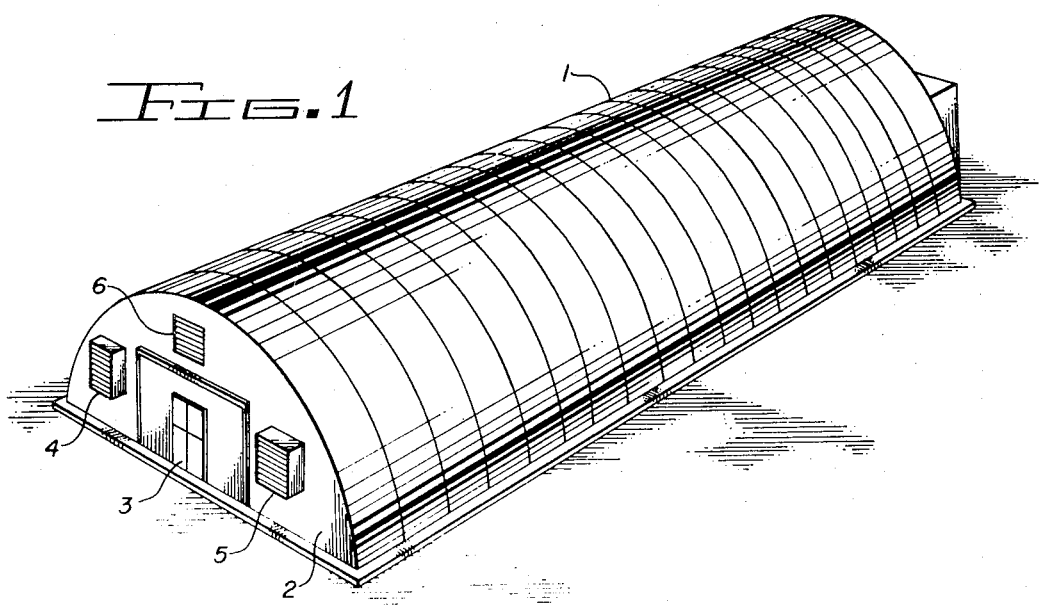
FIG. 1 is a perspective view of an exemplary building incorporating the system of the present invention.
Figure 2:
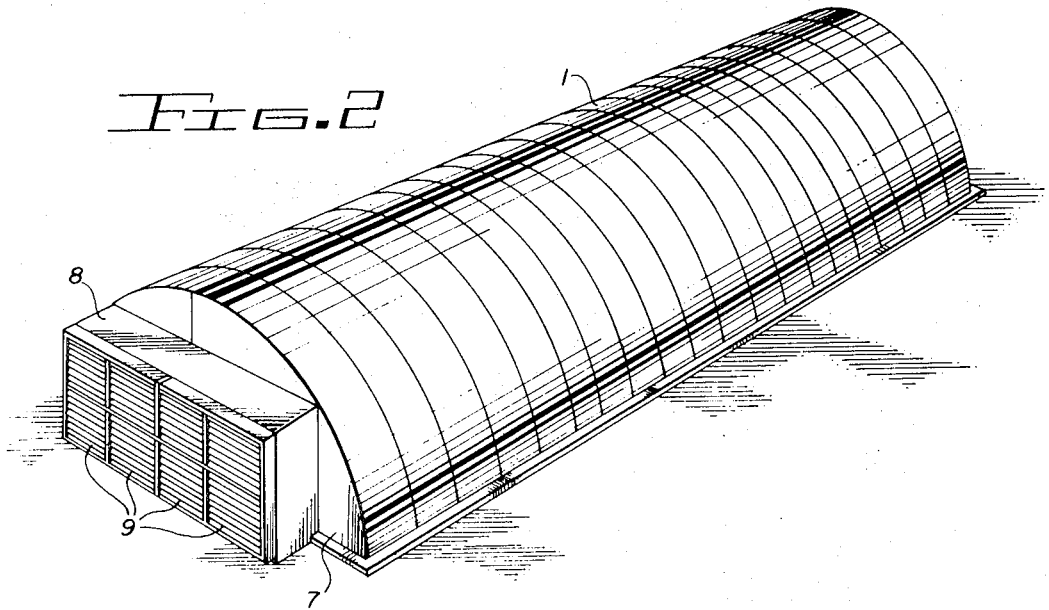
FIG. 2 is a perspective view illustrating the rear structure of the building.

FIGS. 1 and 2 are views illustrating the general external configuration of the building utilized in growing plants hydroponically. Referring to FIG. 1, it will be observed that the building is generally half-cylindrical in shape with the outer circumferential surface 1 consisting of translucent fiberglass as will be described in detail below. The front panel 2 of the building incorporates a door 3 for gaining entrance to the interior of the building, a first exhaust fan 4, a second exhaust fan 5, and an air intake port 6 which is in communication with heater and air distribution apparatus. The functions of the exhaust fans 4 and 5 and the intake port 6 will be described below.

Referring now to FIG. 2, it will be observed that there is a rearward extension 8 from the rear panel 7. The rearward extension 8 comprises a plurality of evaporator pads 9 through which air may be drawn by means of the exhaust fans 4 and 5, FIG. 1, to achieve control of the temperature and humidity within the building. The manner in which evaporative water is selectively supplied to the evaporator pads 9 will be described in further detail below.

Figure 3:
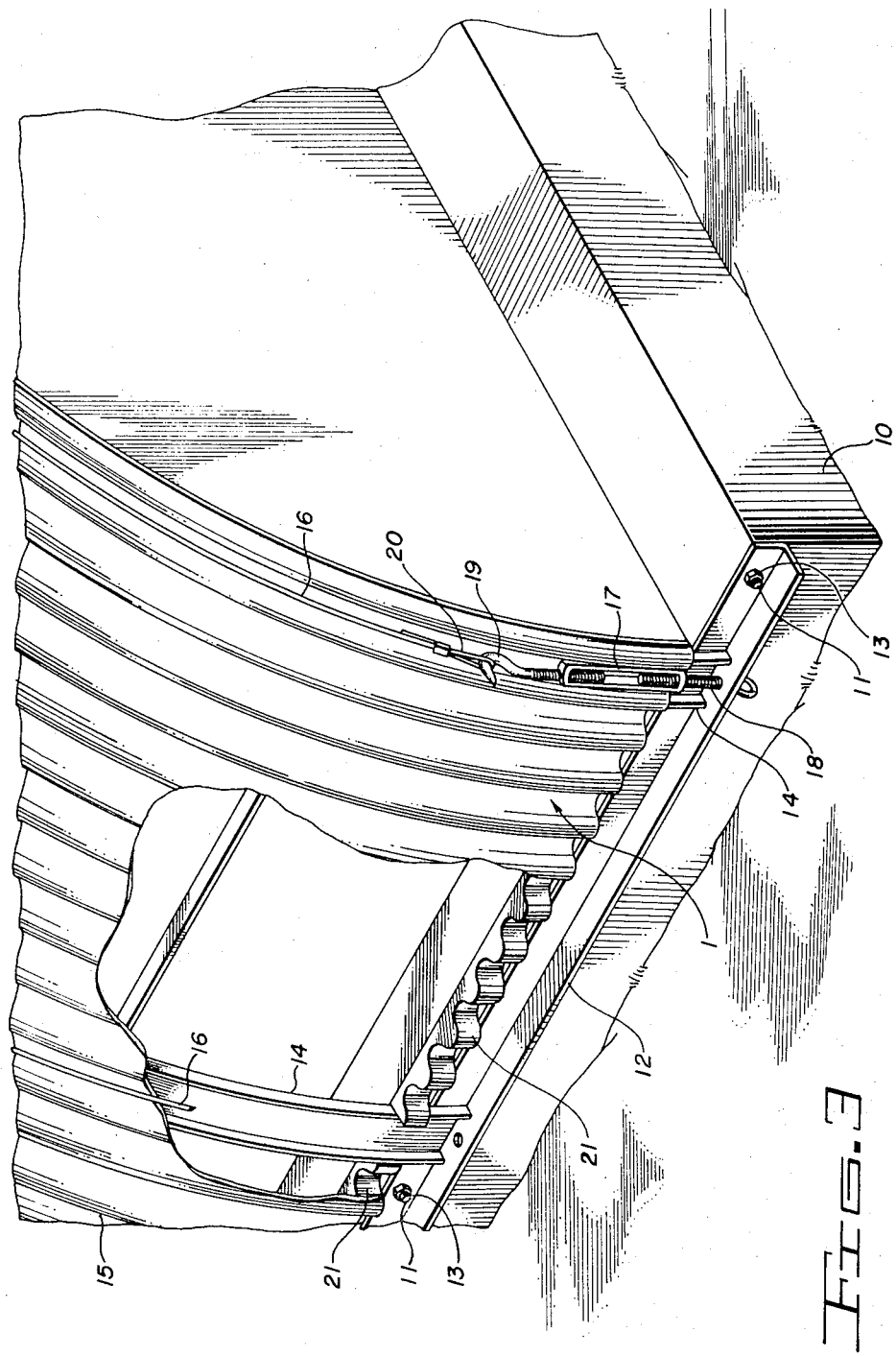
FIG. 3 is a partially cut-away detail view revealing certain aspects of the building construction.

FIG. 3 illustrates certain details of construction of the presently preferred embodiment of the building structure of the invention. The building rests on a concrete foundation 10, and provision is made during the foundation pouring stage of construction to accommodate threaded studs 11 which may be used to secure angle iron 12 to the foundation 10 along the entire length of each side of the building. The angle iron 12 is drilled to receive the studs 11 and are fixed in place by means of nuts 13 tightened onto the studs.

Arcuate channels 14 extend between the angle irons 12 on opposite sides of the building to function as the principal support means for the outer circumferential surface 1 of the building. The surface 1 consists of a plurality of overlapping corrugated fiberglass sheets 15 which are held firmly in place by means of cables 16 which pass over the outer surface of the fiberglass sheets from one side of the building to the other side. The cables 16 bear upon areas of the fiberglass sheets directly above the arcuate channels 14 such that they can be tightened securely without buckling the fiberglass sheets. The cables 16 are tightened by means of turnbuckles 17 which have lower screw elements 18 passing through the angle iron 12 and upper screw elements 19 which terminate in a hook for receiving the looped ends 20 of the cables 16. Scalloped stop members 21 are fixed to the foundation 10 along each side of the building and interlock with adjacent ones of the channels 14 and are configured and dimensioned to accommodate the lower ends of the corrugated fiberglass sheets 15. The scalloped stop members 21 may be of redwood or other rot resistant wood such as pressure-treated pine or cypress.

The ends of the arcuate channels 14 may be secured to the angle irons 12 by welding, bolting, or other conventional means. It has been found, however, that a very satisfactory joint can be made very quickly by using a nail gun to explosively force the projectiles through the channels 14 and the angle irons 12. The projectiles tend to flatten against the foundation 10 to, in effect, rivet the mating pieces together. Additionally, it is preferred that each fiberglass sheet be of sufficient length to extend completely around the half-cylindrical surface in order to achieve a structure of the greatest possible load bearing strength. The half-cylindrical shape utilized has other advantages; viz.: the aerodynamic characteristics are such that the building is able to withstand winds of considerably higher velocity than buildings with vast planar areas, and, from a functional standpoint, the building doesn't "shade" the growing plants within as the angle with respect to the sun changes.

The manner in which the outer circumferential surface is supported and fixed to the foundation 10, as illustrated in FIG. 3 and described above, provides an economical, but very strong and wind resistant construction which has the further advantage of rendering the fiberglass panels 15 relatively easy to replace should any damage to one or more of them occur.

Figure 4:
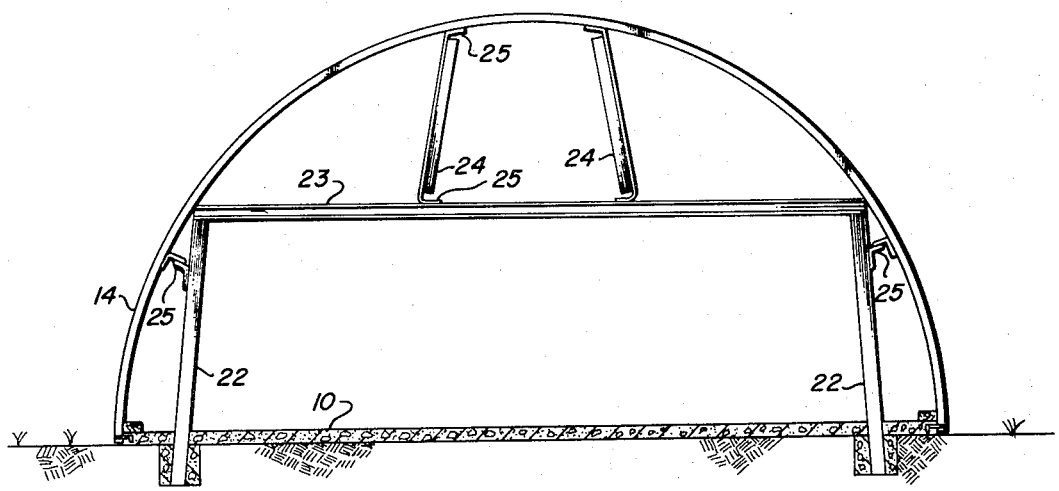
FIG. 4 illustrates interior support structure of a type repeated at intervals along the length of the building.

FIG. 4 shows one of several wall sections disposed at intervals along the length of the building. The wall sections cooperate with the arcuate channels 14 to provide interior support for the outer circumferential surface 1. Slightly inwardly inclined columns 22 are set in concrete approximately 2 ½ feet are coupled together at their upper ends by transverse beams 23. Angle iron uprights 24 depend upwardly and somewhat inwardly inclined from the upper surface of the transverse beam 23 to support the apex of the building. The columns 22 and the upper ends of the angle iron uprights 24 are joined to the arcuate channels 14 by means of ordinary brackets 25 which may be either bolted in place or welded. The lower ends of the angle iron uprights 24 are fixed to the transverse beam 23 in a similar manner.

Figure 5:
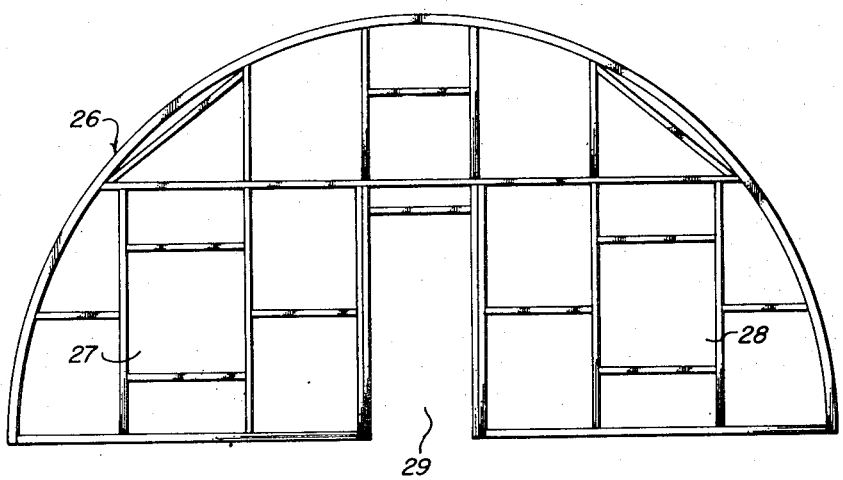
FIG. 5 illustrates the front panel of the building which supports certain of the environmental control apparatus.

FIG. 5 illustrates a preferred configuration for the front end frame 26 which supports the front panel and provides openings 27 and 28 for receiving, respectively, the exhaust fans 4 and 5 discussed in conjunction with FIG. 1 as well as an opening 29 for the door 3.

Figure 6:
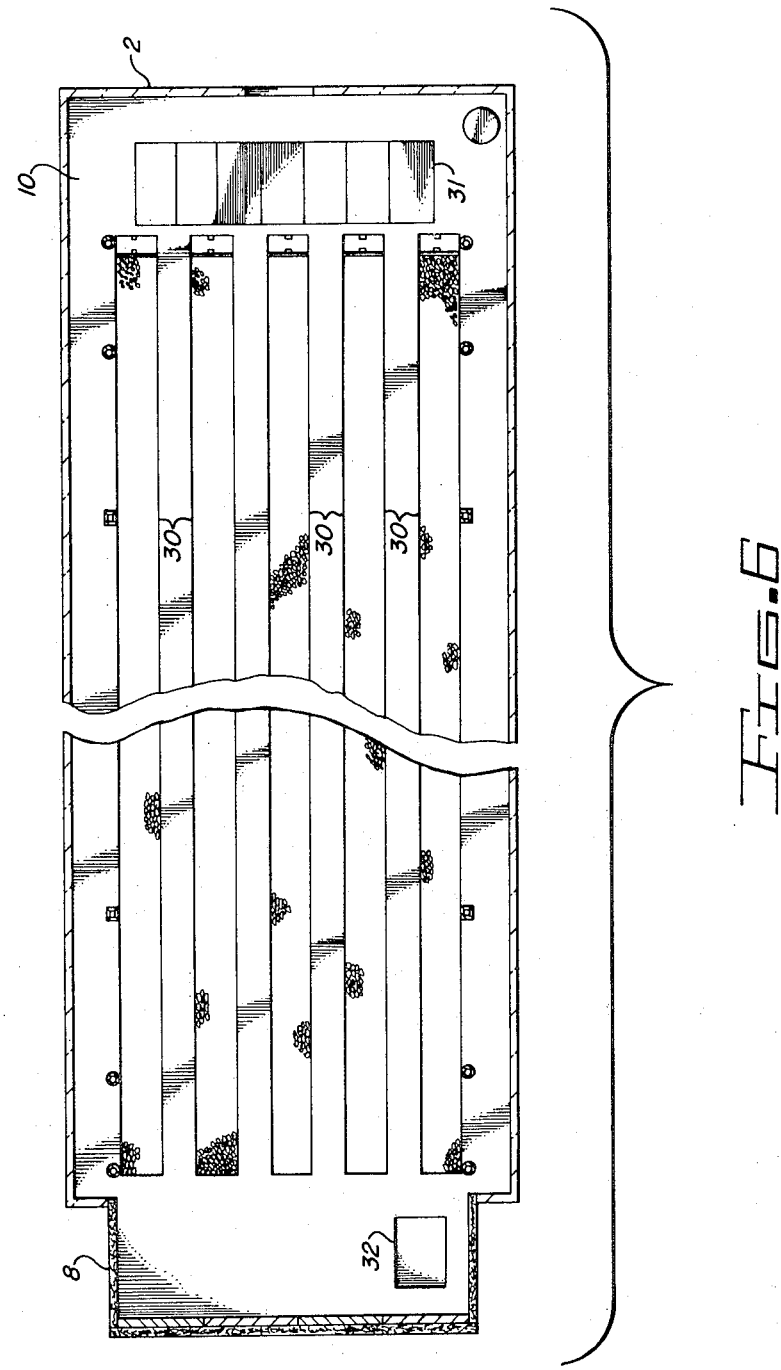
FIG. 6 is a floor plan illustrating the positions of various elements of the system with respect to planter beds.

FIG. 6 presents a simplified floor plan of the building and illustrates the general disposition of the longitudinally extending planter beds 30 formed in the foundation 10. The specific structure of the planter beds will be described in detail as the specification proceeds. At one end of the building, a nutrient reservoir 31 is provided from which liquid nutrient is periodically pumped to the planter beds 30 as will also be presently described. As previously discussed with reference to FIG. 2, a rearward extension 8 supports a plurality of evaporator pads across which water is controllably pumped from a sump 32. As previously discussed with reference to FIG. 1, first and second exhaust fans are disposed in the front panel 2 at the opposite ends of the building from the rearward extension 8 and respond to environmental monitoring apparatus to pull air through the evaporator pads to condition the environment within the building as necessary to maintain optimum growing conditions for a specific crop.

FIG. 7 is a cutaway perspective view illustrating that portion of the environmental control system disposed within and adjacent the front panel 2. In addition to the previously mentioned exhaust fans 4 and 5, which are disposed within the front panel framework, it will be noted that a blower unit 40 is supported from the front panel 2 in a central position above the door 3. The blower unit 40 is cantilevered from the front panel 2 by the box-like intake structure 41 which is open on each side for receiving heated air from the pair of heater-blower units 42 or simply from the front of the building interior if the heater-blower units 42 are not activated. The exhaust from the blower unit 40 is directed into a distribution duct 43 which may take the form of a clear, flexible plastic tube running the building length and supported at intervals from the lower side of the apex of the channel members 14.

As will be presently described in conjunction with the function of various components of the environment control system, the blower unit 40 is utilized to maintain air circulation within the building when the exhaust fans 4 and 5 are not running and also when it is necessary to raise the temperature within the building at which time it receives the output from the heater-blower units 42 for circulation through the distribution duct 43.

The fairly substantial weight of the heater-blower units 42 is carried by angle irons 44 which extend between a heavy beam 45 in the front panel framework to a transverse beam 46 which corresponds to the transverse beam 23 illustrated in FIG. 4 but is further supported by additional columns 47 and buttresses 48 extending into the foundation 10. Thus, a very rigid and sturdy construction is achieved at the forward end of the building.

Attention is now directed to FIG. 8 which discloses detailed structure of portions of the environmental control system housed in the rearward extension 8 from the building. The rearward extension 8 consists generally of a framework 50 which supports a number of evaporative pads 9 about both sides and the rear panel. The evaporative pads 9 are adapted to laden air drawn therethrough with a high moisture content by virtue of their being controllably wetted from a perforated distribution pipe 51 supplied from the sump 32 in accordance with the sensed condition of the environment within the building. By way of example, the evaporative pads 9 may consist of aspen wood fibres held together by the inner 52 and outer 53 wire frames. Excess water is collected in a return gutter 54 which drains directly back to the sump 32.

The evaporative pads 9 disposed on each side of the rearward extension 8 open directly to the interior in such a manner that, as the pressure within the interior of the building is depressed slightly by energizing the exhaust fans 4 and/or 5, outside air will be drawn through them to the interior. However, as will presently become more evident, it is necessary to effect a certain amount of control over the volume of outside air drawn through the evaporative pads 9 when the exhaust fans are activated. In order to achieve control over the volumetric flow through the evaporative pads 9, a plurality of upper louver panels 55 and lower louver panels 57 are disposed on the inside of the rear panel between the rearmost evaporative pads and the interior of the building. Each louver panel 55 may be actuated by the usual electrical louver motors 56 and each louver panel 57 by louver motors 58 such that the louver panels may be opened together or in any combination to control the effective areas of the evaporative pads through which outside air is pulled.

Figure 10:
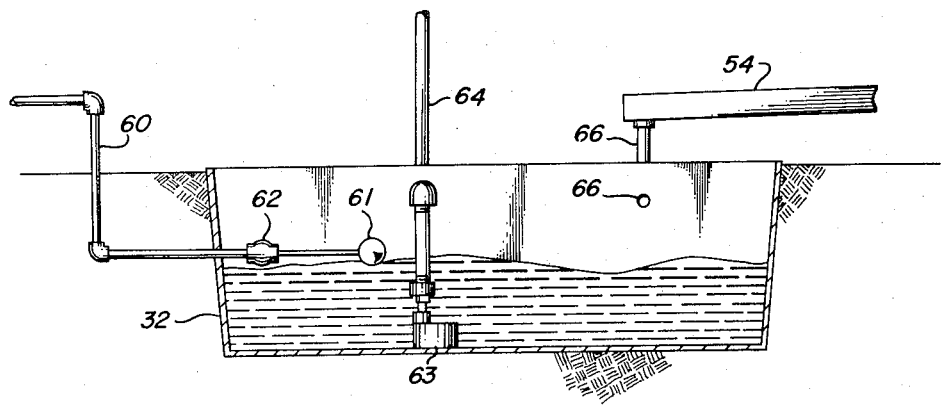
FIG. 10 is a cross-sectional detail view illustrating the pump system used in conjunction with the evaporative pads.
Figure 9:
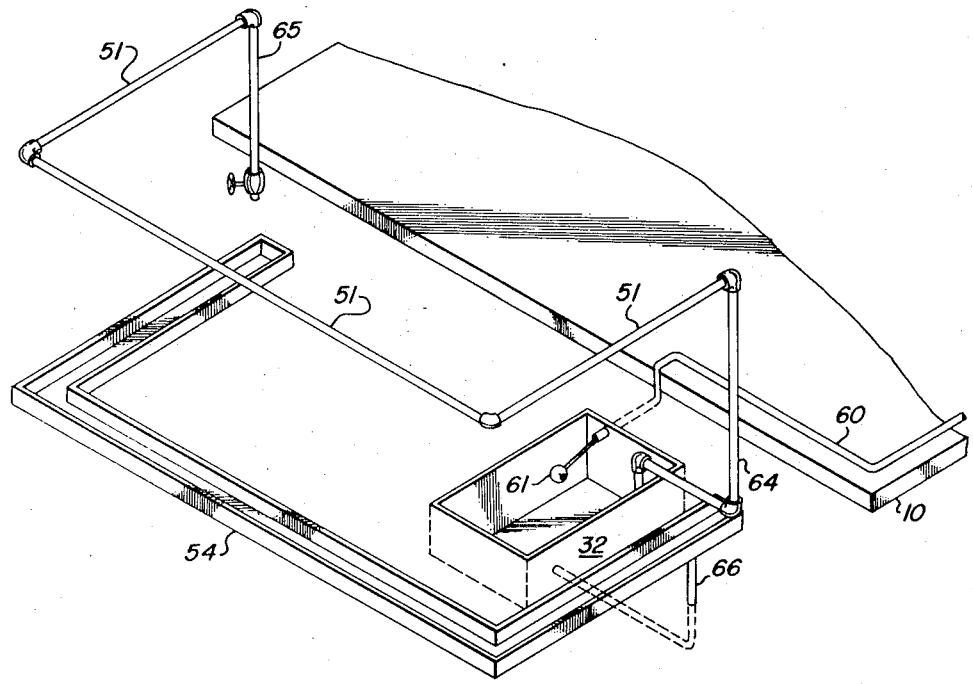
FIG. 9 is a schematic view of the plumbing system for providing water to the evaporative pads.

FIGS. 9 and 10 reveal the water distribution system associated with the sump 32 and evaporative pads. As best shown in FIG. 9, the sump 32 is sunk beneath the upper surface of the foundation 10 and is supplied water from any convenient source through a pipe 60 in accordance with the position of a float 61 which controls the actuation of a valve 62, FIG. 10. A submersible motor driven pump unit 63 is selectively energized by the environmental control monitoring apparatus as will be presently described. When energized, the submersible pump unit 63 forces water through a feeder pipe 64 which couples directly to the perforated distribution pipe 51 which serves to dampen the evaporative pads 9 in the manner heretofore described. Any excess water not distributed through the perforations in the distribution pipe 51 is delivered to the return gutter 54 through a drain pipe 65. The return gutter 54 has a sump return pipe 66 coupled to its lowest point, and the sump return pipe 66 drains directly back into the sump 32 in order to reuse any excess water for obvious reasons of economy. This arrangement is deemed particularly important in arid areas in which water must be effectively utilized.

Figure 11:
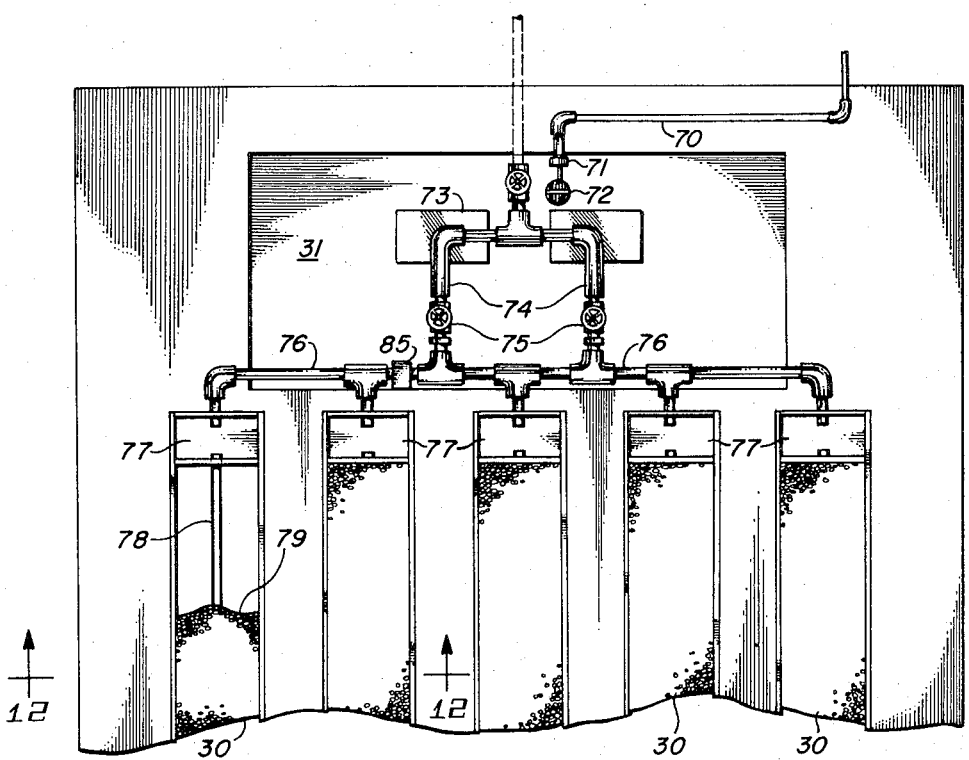
FIG. 11 is a plan view illustrating the nutrient sump and manifold for delivering nutrient solution to the planter beds and for draining excess nutrient solution back to the sump.

FIG. 11 shows the general manner in which liquid nutrient from the nutrient reservoir 31 is provided to the planter beds 30. Attention is directed to the fact that overflow apparatus which is positioned over certain areas of the nutrient supply system are not shown in FIG. 11 for purposes of clarity. Ph-controlled water, from a source to be described later, is available through supply pipe 70 through which the water level in the nutrient reservoir 31 is replenished under the control of a valve 71 selectively activated by a float 72. When moisture probes within the planter 30 determine a need for nutrient solution, submersible electrical pump units 73 are energized to force nutrient solution upwardly and into branch feeder lines 74 which communicate through gate valves 75 to a distribution manifold 76. Nutrient from the distribution manifold 76 flows into small observation reservoirs 77 at the end of each planter bed 30. The nutrient thus delivered to the observation reservoir 77 passes into the combination feeder-drain pipe 78 which lays in the bottom of each planter bed 30 beneath the aggregate plant root support material 79. The feeder-drain pipes 78 are perforated at intervals to permit the nutrient solution to saturate the aggregate 79 to the desired extent according to the length of time the solution is pumped from the reservoir 31. When pumping ceases, excess nutrient solution flows back through the feeder-drain pipes 78 to the observation reservoir 77 and on back to the nutrient reservoir 31. In order to assist the gravity flow, the feeder drain pipes 78 are inclined slightly downwardly toward the observation reservoir 77. An electrically controlled damper 85 is included in the manifold 76 to facilitate drainage of the excess nutrient back into the sump.

Figure 12:
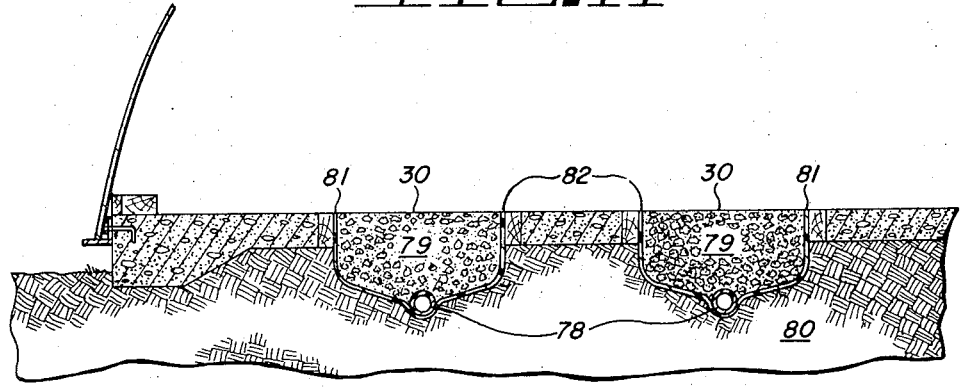
FIG. 12 is a partial cross-sectional view illustrating the interior structure of the planter beds and their relationship to the surrounding building structure.

FIG. 12 is a cross-sectional view illustrating the general configuration of the planter beds 30 and the position of the feeder-drain pipes within the beds. In order to avoid losing any nutrient through seepage, the concrete 80 in which the planter beds 30 are formed is isolated from the aggregate 79 by an impervious vinyl liner 81 which is secured in place to redwood beams 82 prior to filling the beds with the aggregate 79. While an inert waterproof liner is presently preferred to avoid leaching lime from the concrete foundation 10, the use of liners which are not inert, or even foundation materials which are waterproof but not inert, are contemplated for conditions in which beneficial constituents can be leached to the plant roots.

Figure 13:
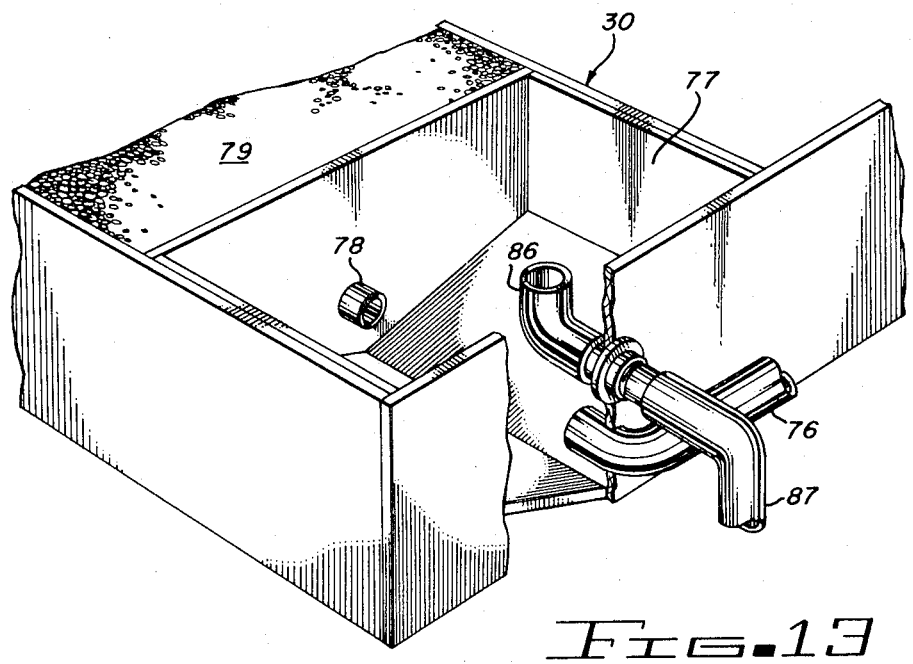
FIG. 13 is a partially cut-away perspective view illustrating the coupling between the manifold and an exemplary planter bed and also illustrating overflow apparatus provided for each planter bed.

FIG. 13 discloses structural details of the planter box and drain apparatus in the area of the observation reservoir 77. The manifold 76 is in communication with the observation reservoir 77 as previously described. Similarly, the feeder drain pipe 78 opens into the observation reservoir 77 to deliver nutrient solution to the aggregate 79 when the solution level in the observation reservoir rises above its opening and return nutrient solution to the reservoir and to the manifold 76 when the nutrient is not being pumped under pressure through the manifold to the reservoir. In order to insure against overflow in the event of a malfunction or misprogramming which causes the planter beds 30 to become completely filled, an overflow assembly including a rotatable elbow 86 opening within the reservoir 77 and a stationary, downwardly directed elbow 87 opening into the nutrient reservoir 31 is provided. It will be observed that the level of nutrient solution within the observation reservoir 77 at which the overflow assembly becomes effective may be adjusted by simply rotating the elbow 86 until the opening is situated at the desired level.

Figure 14:
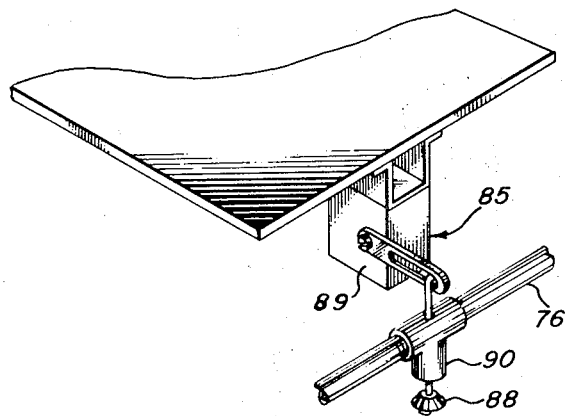
FIG. 14 is a perspective view of electric valve apparatus utilized in effecting manifold function change from supply to drain.

Inasmuch as ordinary drainage from the planter beds 30 takes place through the same manifold 76 through which nutrient is also supplied under pressure, the utilization of the damper 85, FIGS. 11 and 14, permits the drainage of the effluent directly into the nutrient reservoir 31 without passing through the pump impellers. Referring specifically to FIG. 14, the damper 85 consists of a valve 88 actuated by a rotary valve motor 89 or the like. The logic of the electrical system functions to energize the valve motor 89 when the pumps 73 are energized thereby closing off the valve 88 which may be a rotary solenoid or the like. When the pumps 73 are de-energized, the valve motor 79 is also de-energized to permit the valve 88 to drop into the open position such that nutrient solution within the manifold 76 may flow directly through the drain pipe 90 and fall directly into the nutrient reservoir 31.

Figure 15:
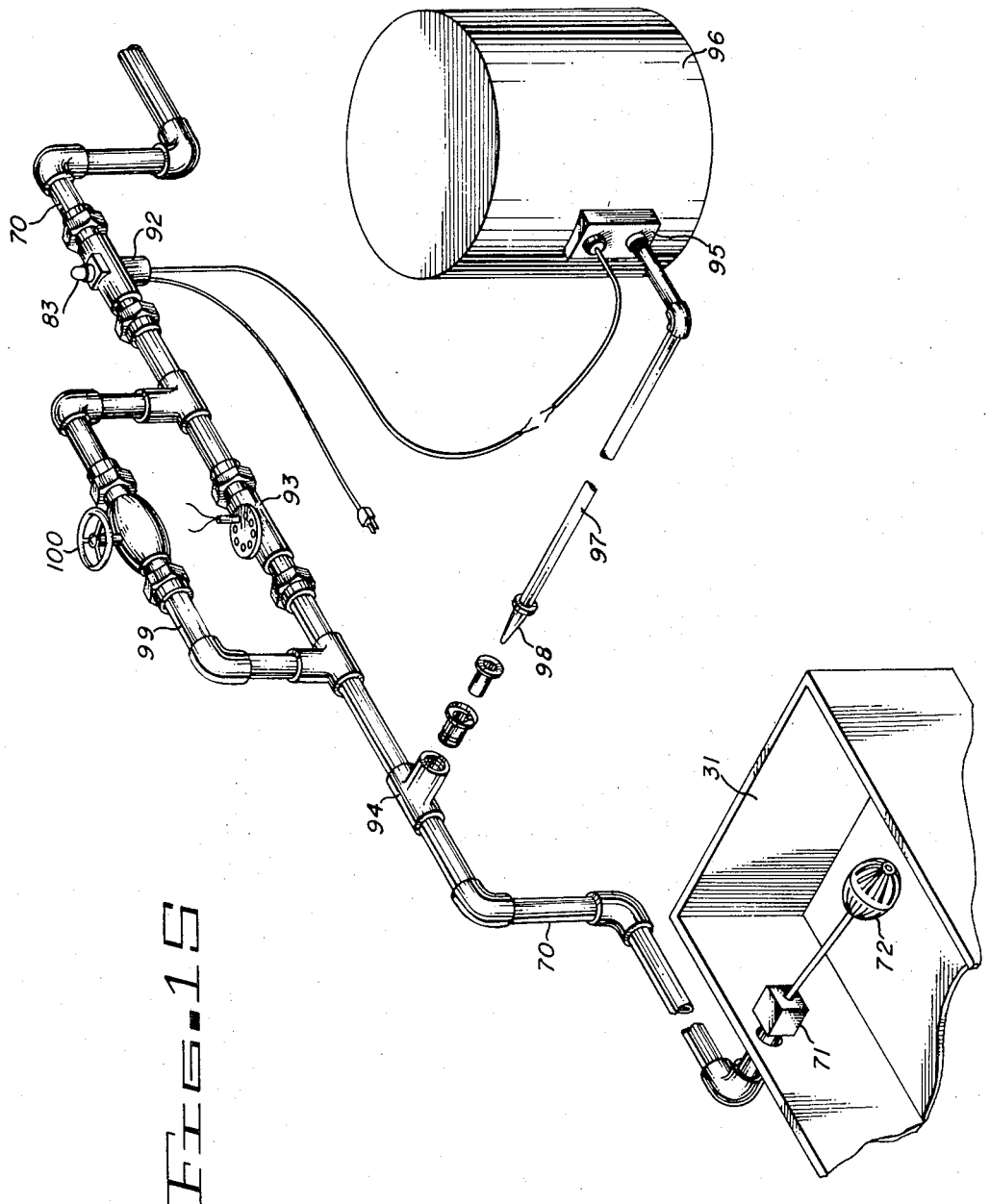
FIG. 15 is a partially exploded schematic view illustrating the makeup water pumping system for the nutrient sump including means for controlling the nutrient solution ph.

In order to maintain the ph of the nutrient solution in the nutrient reservoir 31 at the appropriate level, the replenishing system is provided with reagent injection control apparatus as illustrated in FIG. 15. Raw supply water, available from any suitable source, passes through a supply pipe 70 which includes a flow responsive switch 92, a solenoid operated valve 93, a T-fitting 94 and a flow valve 71 operated by float 72. Growth control apparatus, to be described below, actuates the solenoid operated valve 93 at a convenient time, such as at night, to institute water flow through the supply pipe 70. The flow responsive switch 92 senses the flow and energizes a reagent pump 95 which is mounted on the side of a reagent storage tank 96. The reagent storage tank 96 may typically contain sulfuric acid. The reagent pump 95 forces reagent solution under pressure through a reagent supply pipe 97 and through an injector 98, shown in exploded view in FIG. 15, which serves to mix the reagent solution into the water within the T-fitting 94 after which the conditioned water flows into the nutrient reservoir 31 until the float 72 raises sufficiently to close the valve 71 thereby interrupting the water flow. When the flow is cut off by the valve 71, the flow responsive switch 92 opens to interrupt the electrical current flow to the reagent pump 95 which thus ceases to inject reagent solution into the supply pipe 70. A bypass pipe 99 around the solenoid operated valve 93 is fitted with a manually operable valve 100 to permit the manual institution of the replenishment cycle at times other than those directed by the growth control apparatus. By way of example, this may be necessary under extraordinarily hot and arid conditions during which the nutrient is consumed and evaporates at an abnormally accelerated rate.

It is desirable, particularly when the added reagent is acid, to insure against the contingency that the flow responsive switch 92 might stick or other condition occur which would maintain the flow responsive switch actuated to overcondition the water. Therefore, warning lamp 83 is energized in parallel with the reagent pump 95 to provide a visual indication that reagent solution is being injected into the system.

Figure 16:
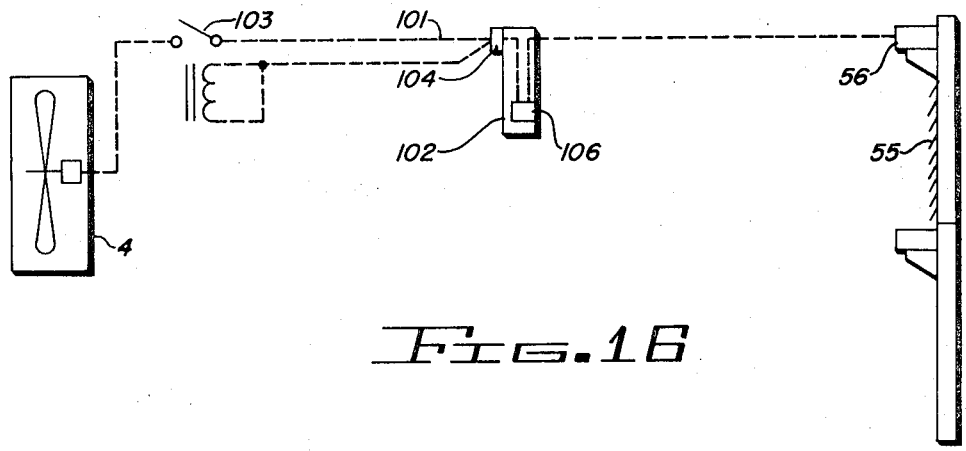
FIG. 16 is a simplified wiring diagram illustrating the dry fan function.
Figure 17:
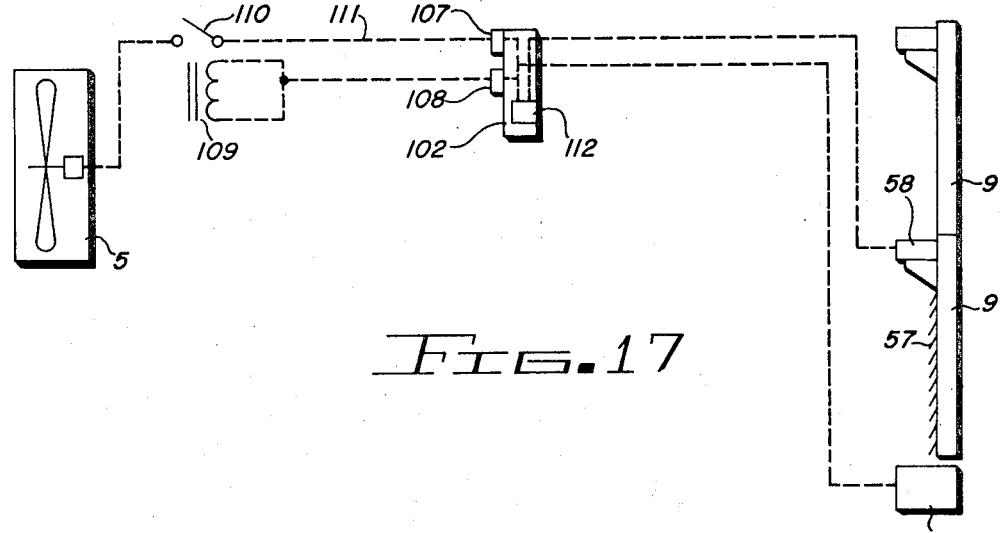
FIG. 17 is a simplified wiring diagram illustrating the wet fan function.
Figure 18:
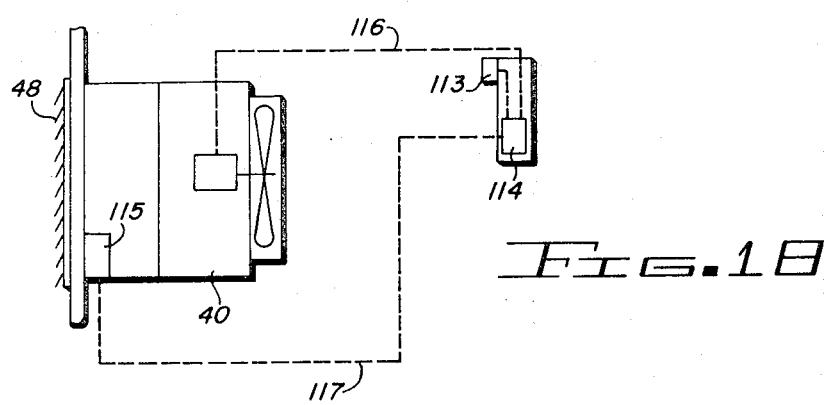
FIG. 18 is a simplified wiring diagram illustrating the air circulation and temperature control apparatus utilized when neither the wet fan nor the dry fan is operating.

The various states which the environmental control system can assume in response to sensed conditions are illustrated schematically in FIGS. 16, 17, and 18. Referring specifically to FIG. 16, the exhaust fan 4, which is designated the "dry fan" receives electrical energy through a line 101 from an environmental control box 102 through relay contacts 103. A thermostat 104 located on the environmental control box 102 closes upon a temperature rise above a preset temperature to activate relay 105 to close the contacts 103 and start the dry fan 4. The thermostat simultaneously energizes a transformer 106 within the environmental control box 102 to provide 24 volts to the upper louver motors 56 which open the upper louver panels 55. Thus, outside air is drawn through the evaporative pad area normally exposed and also the area controlled by the upper louver panels, through the building and out the dry fan 4 until the temperature sensed by the thermostat 4 is sufficiently depressed to deactivate the thermostat and thus de-energize the exhaust fan 4 and the upper louver motor 56.

FIG. 17 illustrates a second condition in which the second exhaust fan 5, which is designated the "wet fan" is operated in conjunction with the lower louver panels 57 and the submersible pump unit 63 to pull water laden and evaporatively cooled air through the building. This function is controlled through the coordinated response of a second thermostat 107 and an humidistat 108 on the environmental control box 102. The thermostat 107 closes when the temperature exceeds a predetermined temperature, and the humidistat 108 closes when the humidity falls below a predetermined minimum. The contacts of the thermostat 107 and the humidistat 108 are disposed in series such that, when both conditions are satisfied, a relay 109 is energized to close contacts 110 to supply power to the wet fan 5 through the line 111. Simultaneously, 115V a-c is supplied to the submersible pump unit 63 to institute water flow to the evaporative pads 9 as previously described in conjunction with FIG. 8. A second step down transformer 112 is also energized to provide 24 volts to the lower louver motors 58 which open the lower louvers 67 permitting outside air to be drawn through the normally exposed areas of the evaporative pads 9 and also through the area controlled by the lower louvers 57. It will be appreciated that the conditions described for setting up the configuration illustrated in FIGS. 16 and 17 can occur simultaneously such that both the upper and lower louvers 55 and 57 and the dry and wet fans 4 and 5 may be energized simultaneously along with the submersible pump unit 63.

Referring simultaneously to FIGS. 18 and 7, the operation of the blower unit 40 is observed to provide air circulation in the building when neither the dry fan 4 nor the wet fan 5 is in operation. A thermostat 113 is activated when the ambient temperature within the building falls below a predetermined minimum to energize a relay 114. The contacts of the relay 114, when closed, supply electrical energy to the blower unit 40 and to a louver motor 115, through lines 116 and 117, respectively. The louver motor 115 opens the louvers 48 to admit fresh air to the intake of the blower unit 40 which exhaust into the perforated distribution duct 43 such that unconditioned outside air is distributed in the building. Referring specifically to FIG. 7, if the temperature of the outside air brought in through the louvers 48 is insufficient to maintain the minimum ambient temperature within the building, thermostats integral with the heater-blower units 42 are activated such that heated, recirculated air is pulled through the heater-blower units 42 and directed at the open sided intake structure 41 of the blower unit 40 for distribution along the length of the building. It will be observed by those skilled in the art that the environmental control system described in conjunction with FIGS. 7, 8, 16, 17, and 18 cooperate to hold both the temperature and the humidity in the growing chamber within predetermined set points according to the crop being grown and essentially independent of the ambient environment.

Figure 19:
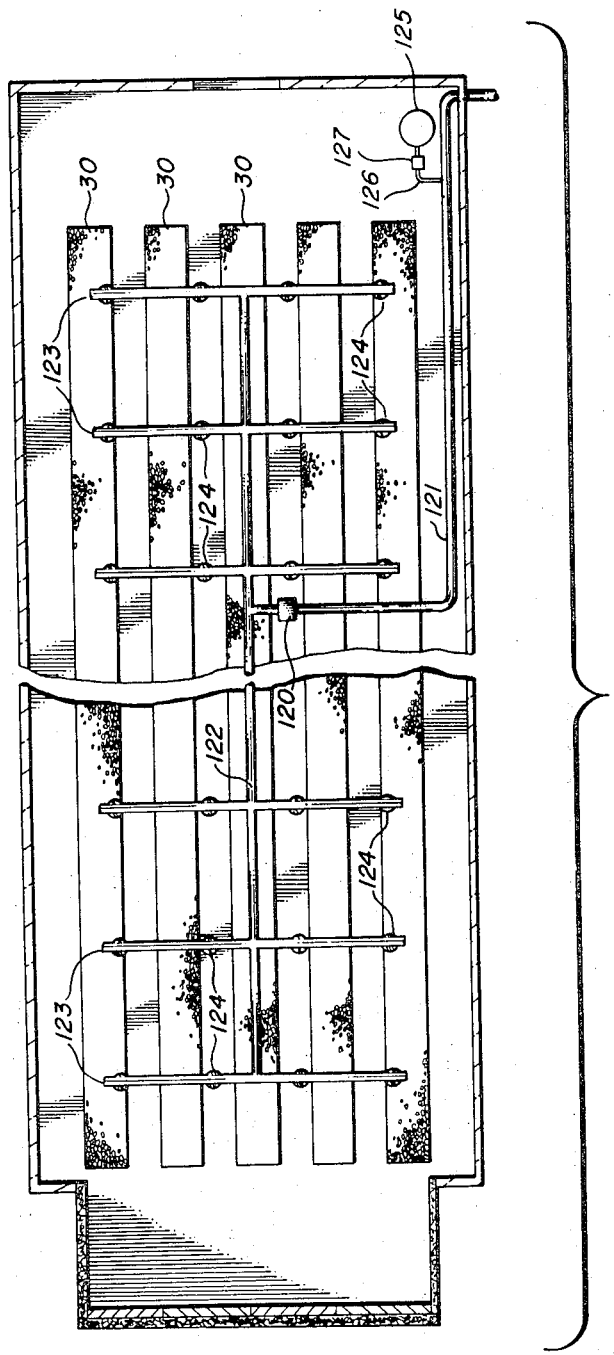
FIG. 19 is an overhead plan view depicting the misting apparatus utilized to control the effects of overly intense sunlight, and which can also function to provide nutrients to the growing plants by foliar feeding.

In geographic locations at which extremely hot day time temperatures are expected, such as the Arizona and California desert, it is sometimes necessary to employ extraordinary measures to protect the growing beds against the heat and radiation intensity of the sun. When such conditions are encountered, the growing plants are protected by the fogging system illustrated in the overhead view of FIG. 19. A thermostatically controlled valve 120 is disposed in a supply line 121 from an ordinary source of water under pressure. The discharge side of the thermostatically controlled valve 120 feeds an overhead distribution pipe 122 for conveying water to a plurality of transverse overhead fogging pipes 123 disposed above the planter beds 30. Each fogging pipe carries a plurality of downwardly directed fogging nozzles 124 which release a very fine mist when supplied with water under pressure which takes place when the thermostatically controlled valve 120 is actuated by a temperature increase above a predetermined set point temperature. The fine mist serves to effect a rapid cooling because of the heat absorbed through evaporation and also serves to partially filter out radiation which, if too intense, can damage the plants.

In addition to its environmental control function, the fogging system can be utilized to effect foliar feeding of plants grown within the building. It may be observed that, with root feeding alone certain nutrients will only go a limited distance up the plant stems, a condition that can be corrected with foliar feeding. A tank 125 containing nutrient solution for the foliar feeding is controllably injected into the supply line 121 through a line 126 by means of a proportioner 127. Further, it is contemplated that a series of tanks, corresponding to the tank 125, may be paralleled to respond to specific sensed needs for achieving foliar feeding of specific nutrients such as iron, calcium, manganese, zinc, nitrogen, potassium, magnesium, etc. Each tank, in such a system, would contain a specific nutrient, and the proportioner would be under control of a sensor responsive to a deficiency of the specific nutrient within the growing environment.

Figure 20:
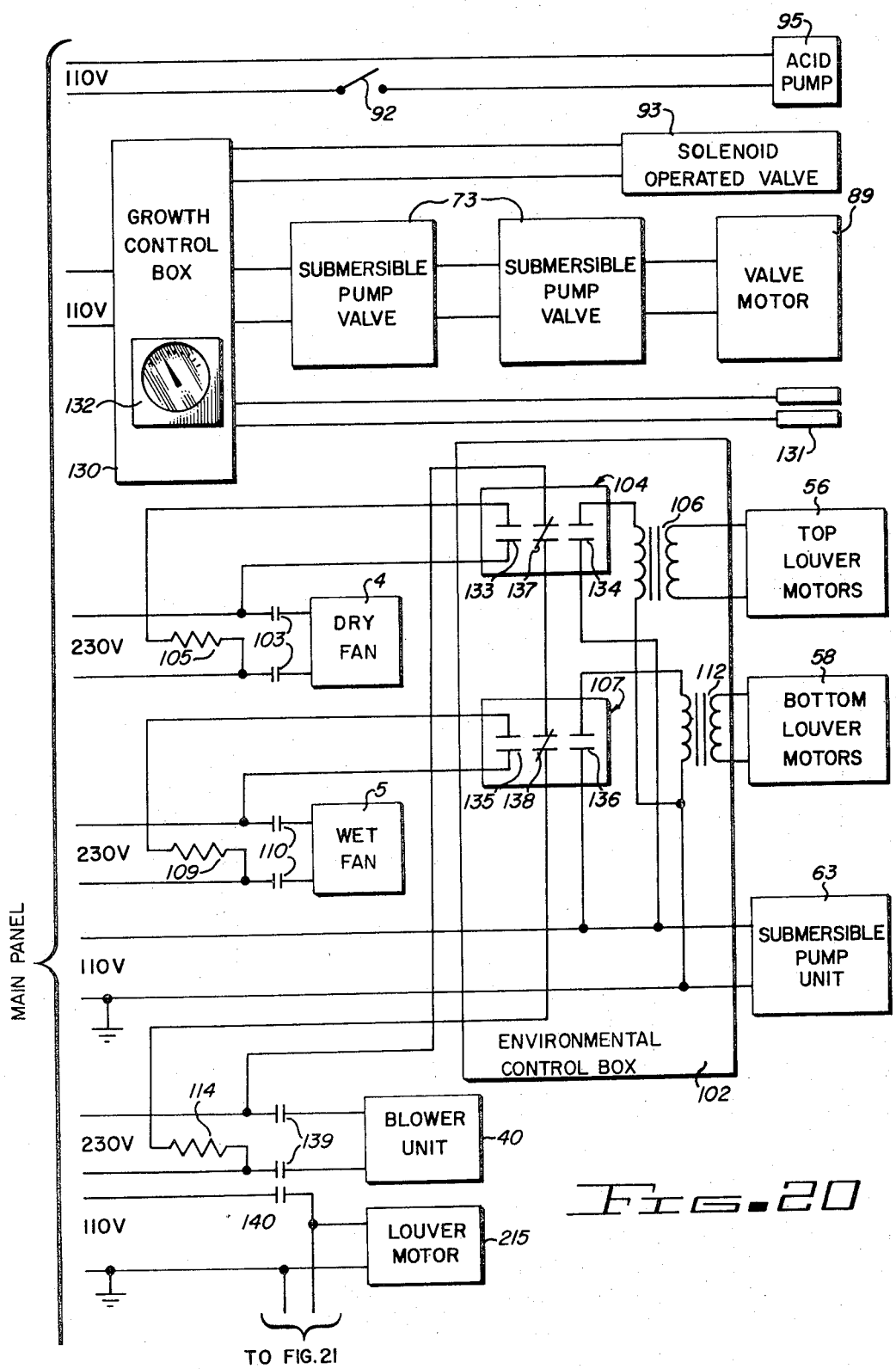

FIGS. 20 and 21, taken together, constitute an elementary wiring diagram of the electrical system within the building. Most of the wiring depicted in FIGS. 20 and 21 has been previously discussed in conjunction with the environmental control and growth control functions. Referring specifically to FIG. 20, the growth control box 130 is energized from a 110 volt line and also receives a sensor input from moisture control probes 131 which are deposited within the planter beds at a level corresponding to that to which it is desired the nutrient solution should raise to during the nutrient pumping cycle. The growth control box 130, which may be in accord with U.S. Pat. No. 2,911,156, entitled "Lawn Sprinkler Control" and issued Nov. 3, 1959 to Jeff. E. Freeman, responds to both the moisture sensed by the moisture control probe 131 and an integral timer 132 to selectively energize the submersible pump units 73, the valve motor 89, and the solenoid operated valve 93 as previously described. The flow responsive switch 92 is directly in circuit with the acid pump 95 as also previously described.

The dry fan 4 and the wet fan 5 as well as the top and bottom louver motors 56 and 58 and the submersible pump units 63 are controlled from the environmental control box 102 including thermostats 104 and 107 and transformers 106 and 112 as previously described. The thermostat 104 includes a pair of contacts 133 and 134 which close circuits to, respectively, the relay coil 105 and the primary winding of the transformer 106. When the contacts 133 close to energize the relay coil 105, the relay contacts 103 close to power the dry fan 4. Simultaneously, the contacts 134 close to complete the circuit to the primary winding of the transformer 106 from external 110 volt supply. The 24 volt secondary winding of the transformer 106 powers the top louver motor 56. Similarly, the thermostat 107 has two independent contacts 135 and 136 which are in circuit, respectively, with relay coil 109 and primary winding of transformer 112. Additionally, the submersible pump unit 63 is disposed in parallel with the primary winding of the transformer 112. When the contact 135 closes, the relay coil 109 is energized to close the relay contacts 110 to power the wet fan 5. Simultaneously, the closure of the thermostat contact 136 energizes the primary winding of the transformer 112 whose secondary winding is coupled to the bottom louver motors 58. At the same time, the submersible pump unit 63 is energized from the 110 volt line through the contact 136.

Each of the thermostats 104 and 107 are provided with a pair of normally closed contacts 137 and 138 respectively which are disposed in series connection with the relay coil 114. Thus, when neither the thermostats 104 or 107 are actuated, the circuit is completed to energize the relay coil 114 thereby closing the contacts 139 to energize blower unit 40 and also the contact 140 to activate the louver motor 115. Accordingly, when neither the dry fan 4 nor the wet fan 5 is operating, the blower unit 40 draws outside air through the louvers 48 to maintain circulation within the building. Additionally, closure of the relay contact 140 also energizes the blowers 141 of the heater-blower units 42 and activate, through transformers 142, the heater control elements 143 which are coupled to the thermostat 113. As previously discussed, when the building temperature falls below a predetermined minimum, the thermostat 113 is activated to energize the heater controls 143 which function to fire the heaters, thus bringing about the circulation of heated air through the building.

Overhead lamps 144 are coupled, through a switch 145 to a 110 volt source which also feeds one or more ordinary convenience outlets 146 located throughout the building.

Thus, a complete system for growing plants hydroponically has been disclosed. Those skilled in the art will appreciate that the fundamental principles of the building construction and the environmental control apparatus may be incorporated, with equal effect, in a growing system utilizing soil; i.e., a greenhouse. Further, the building construction, because of its combination of durability and economy, may be used to advantage for housing animals and to provide enclosed storage space in general.

Attention is directed to the fact that the manner in which the interior of the building is conditioned for growing plants provides a virtually pollution free growing environment. The evaporative pads are extremely effective in removing particulate pollution and further bring about chemical reactions which significantly reduce the chemical pollutants. Of course, as will occur to those skilled in the art, where necessary and desirable, auxiliary filter media or other means for removing particulate or gaseous pollutants can be employed in addition to the evaporative pads to even further reduce the overall level of pollutants within the building.

The incorporation of additional apparatus to further stimulate growth is also contemplated. For example, the growing environment may be further conditioned by the selective introduction of gases such as carbon dioxide into the building. Similarly, it has been demonstrated that the application of various forms of energy such as, for example, sound waves in the audible and supersonic frequency ranges stimulates plant growth, and inasmuch as the buildings disclosed herein constitute an enclosed space, the provision of apparatus for subjecting the plants to such energy bombardment can be readily integrated into the building.

Thus, the use of artificial light to stimulate plant growth is also contemplated and can be readily effected by providing overhead lamps issuing the desired spectrum in conjunction with conventional timer apparatus.

Similarly, another contemplated stimulus for accelerating plant growth is the enclosure of the buildings within a magnetic field. Such fields have been demonstrated to promote growth. The reason for the observed positive effects are not fully understood at this time. It may be speculated that the ionic characteristics of the nutrients result in more uniform and thorough distribution of the nutrients as a result of subjecting the plants to the effects of a magnetic field.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. A controlled environment hydroponic system including:
    a. hydroponic plant-growing apparatus, including
        1. at least one hydroponic growing bed containing inert plant-root support media, and
        2. means for selectively periodically introducing hydroponic plant nutrient solution to said growing bed;
    b. means translucent to actinic solar radiation forming an enclosure for said plant-growing apparatus;
    c. environmental conditioning apparatus including
        1. an air recirculation system including circulating fan means, for recirculating air in said enclosure,
        2. a combination ventilation-cooling-humidifying system for selectively
            introducing ambient air into said enclosure, circulating said air therethrough, and exhausting said air therefrom in a first mode of operation, and
            cooling and humidifying ambient air, circulating said cooled and humidified ambient air through said enclosure and exhausting it therefrom in a second mode of operation,
        said combination system including
            evaporative pad means located in a wall of said enclosure,
            evaporative cooling water supply means for selectively supplying evaporative cooling water to said evaporative pad means,
            fan means for passing ambient air from the exterior of said enclosure, through said pad means, through said enclosure and exhausting it therefrom, and
            louver means operatively associated with said evaporative pad means, including an upper louver panel and a lower louver panel; and
    d. a control system for said environmental conditioning apparatus, including
        1. sensor-signaling apparatus including
            means for sensing the temperature of air in said enclosure and for generating signals when said temperature rises above and falls below preselected levels,
            means for sensing the humidity of air in said enclosure and for generating signals when said humidity rises above and falls below preselected levels, and
        2. means responsive to said sensor-signaling apparatus signals
            to automatically activate said fan means when said temperature is above a first preselected level and independently of said humidity,
            to automatically activate said evaporative cooling water supply means only when said temperature is above a second preselected level higher than said first preselected level and said humidity is below a preselected level,
            to automatically open said upper louver panel when said temperature is above said first preselected level and independently of said humidity,
            to automatically open said lower louver panel only when said temperature is above said second preselected level, and
            to automatically activate said air recirculation system at least when said temperature is below said first preselected level and independently of said humidity.

* * * * *